US012722981B2

(12) United States Patent
Mack et al.

(10) Patent No.: US 12,722,981 B2
(45) Date of Patent: Sep. 1, 2026

(54) COMPOSITION OF AN ULTRA-PURE ZINC BROMIDE AND ZINC CHLORIDE BLEND PRODUCED FROM A METHOD OF REACTING CHLORINE WITH A MIXTURE OF ZINC BROMIDE AND ZINC

(71) Applicant: TETRA Technologies Inc., The Woodlands, TX (US)

(72) Inventors: Arthur Mack, The Woodlands, TX (US); Zheng Chai, The Woodlands, TX (US); Jermichael Anderson, The Woodlands, TX (US); Christina Botti Downing, The Woodlands, TX (US); Archie Vest, The Woodlands, TX (US)

(73) Assignee: TETRA Technologies, Inc., Spring, TX (US)

( * ) Notice: Subject to any disclaimer, the term of this patent is extended or adjusted under 35 U.S.C. 154(b) by 499 days.

(21) Appl. No.: 18/458,928

(22) Filed: Aug. 30, 2023

(65) Prior Publication Data

US 2025/0074785 A1 Mar. 6, 2025

(51) Int. Cl.

| | |
|---|---|
| ***C01G 9/04*** | (2006.01) |
| ***B01D 29/01*** | (2006.01) |
| ***B01J 19/00*** | (2006.01) |
| ***B01J 19/18*** | (2006.01) |

(52) U.S. Cl.

CPC ............... *C01G 9/04* (2013.01); *B01D 29/01* (2013.01); *B01J 19/0013* (2013.01); *B01J 19/1806* (2013.01)

(58) Field of Classification Search

None

See application file for complete search history.

(56) References Cited

U.S. PATENT DOCUMENTS

| | | | |
|---|---|---|---|
| 4,401,531 | A | 8/1983 | Martin San Lorenzo |
| 4,572,771 | A | 2/1986 | Duyvesteyn |
| 6,036,937 | A | 3/2000 | Dunaway |
| 8,992,882 | B2 | 3/2015 | Sauer |

(Continued)

OTHER PUBLICATIONS

Cai, S., et al. Water-salt oligomers enable supersoluble electrolytes for high-performance aqueous batteries. Adv. Mater. 2021, 2007470. (Year: 2021).*

(Continued)

*Primary Examiner* — Anthony J Zimmer
*Assistant Examiner* — Zachary John Baum
(74) *Attorney, Agent, or Firm* — Roy Kiesel Ford Doody & North, APLC; Brett A. North

(57) ABSTRACT

The present disclosure provides various characteristics of a method for the production of an ultra-pure zinc bromide and zinc chloride fluid blend in a reactor system, having reduced metal impurities for the use in battery electrolyte blends, by reacting chlorine with a mixture of zinc bromide and zinc. The method disclosed can be used in continuous flow or batch processing and uses a zinc bromide to aqueous solution as catalyst in a reaction with chlorine. Chlorine, whether in liquid or gas form, added into a reactor at a controlled rate reacts with bromide to generate bromine in a much faster rate that when the zinc bromide to aqueous solution would not be present. Any un-reacted zinc is then filtered out which will ultimately result in the ultra-pure zinc bromide and zinc chloride fluid blend.

4 Claims, 4 Drawing Sheets

(56) References Cited

U.S. PATENT DOCUMENTS

| | | | | |
|---|---|---|---|---|
| 2005/0006247 | A1 * | 1/2005 | Vandenhaute | C01G 9/04 423/491 |
| 2005/0126338 | A1 * | 6/2005 | Yadav | B82Y 30/00 75/343 |
| 2020/0095132 | A1 * | 3/2020 | Fukuchi | C01G 9/04 |

OTHER PUBLICATIONS

J.Y. Lee, Y. Pranolo, W. Zhang, C. Y. Cheung; The Recovery of Zinc and Manganese from Synthetic Spent-Battery Leach Solutions by Solvent Extraction; Taylor & Francis Informa Ltd Registered in England and Wales Registered No. 1072954 Registered office: Mortimer House, 37-41 Mortimer Street, London W1T 3JH, UK; pp. 73-84; Jan. 11, 2010.

* cited by examiner

COMPOSITION OF AN ULTRA-PURE ZINC BROMIDE AND ZINC CHLORIDE BLEND PRODUCED FROM A METHOD OF REACTING CHLORINE WITH A MIXTURE OF ZINC BROMIDE AND ZINC

TECHNICAL FIELD

The present disclosure relates generally to a composition of zinc bromide to zinc chloride blend produced by reacting chlorine with a mixture of zinc bromide and zinc, the blend having reduced metal impurities for the use in battery electrolyte blends.

BACKGROUND

1. The Need to Build Better Zinc Bromide Flow Batteries

Energy storage devices (batteries) with high energy density, long cycling life, and low cost are eternal goals to meet the ever-increasing demands from portable electronic devices, electric vehicles, and renewable energy sources (See Armand M., Tarascon J. M. *Building better batteries*. Nature. 2008; 451:652-657). Electrolytes added to these energy storage devices serve as catalyst to make a battery conductive by promoting the movement of ions from the cathode to the anode on charge and in reverse on discharge. Ions are electrically charged atoms that have lost or gained electrons. The electrolyte of a battery consists of soluble salts, acids, or other bases in liquid, gelled and dry formats. Electrolyte also comes in a polymer, as used in the solid-state battery, solid ceramic, and molten salts, as in the sodium-sulfur battery.

Among the several types of batteries, zinc bromide batteries can be split into two groups: flow and non-flow batteries. A typical $ZnBr_2$ flow battery is composed of two reservoirs for storage of the $ZnBr_2$ electrolyte, which are connected to the reactor by pumps or pipes (See Ke X. Y., Prahl J. M., Alexander J. I. D., Wainright J. S., Zawodzinski T. A., Savinell R. F. *Rechargeable redox flow batteries: flow fields, stacks, and design considerations*. Chem. Soc. Rev. 2018; 47:8721-8743). The basic redox reactions in these batteries are summarized as following equations:

At the Positive Electrode:

$$2Br^- - \leftrightarrow Br_2 + 2e^- (E^0 = 1.08\ V \text{ versus } SHE) \tag{1}$$

At the Negative Electrode:

$$Zn + +2e^- \leftrightarrow Zn\ (E^0 = -0.76\ V \text{ versus } SHE) \tag{2}$$

Overall Reaction:

$$Zn + +2Br^- \leftrightarrow Br_2 + Zn\ (E^0 = 1.84\ V) \tag{3}$$

This process of preparing metal bromides from free metals and bromine has been reported in patent literature. For example, U.S. Pat. No. 4,138,354 to Sochol et al. discloses a process for preparing manganese and cobalt bromide from manganese, cobalt bromide, and bromine. The process depends upon an oxidation-reduction reaction between manganese and the cobaltous ion and the subsequent reaction of the generated cobalt with aqueous bromine. U.S. Pat. No. 4,248,850 to Keblys teaches the preparation of metal bromides from a basic metal compound and bromine in the presence of formaldehyde as a reducing agent. U.S. Pat. No. 4,514,374 to Kirsch teaches the use of a lower alkanol as a reducing agent. U.S. Pat. No. 1,483,852 to Rosenstein discloses the production of zinc chloride by reacting lead-zinc alloy in water with chlorine gas. Lead metal is alloyed with zinc metal, and the lead serves as a catalyst for the reaction of the chlorine with the zinc. Chlorine reacts with the zinc-lead alloy to produce zinc chloride. Heat from the reaction causes water to evaporate as steam. The concentration of zinc chloride is controlled by the rate of water dropping or flowing through zinc particles in a zinc-receiving pipe. The Rosenstein disclosure states that the process cannot be worked with pure zinc.

On the other hand, U.S. Pat. No. 2,415,346 to Farr discloses a process of making zinc bromide by reacting zinc chloride with hydrobromic acid under boiling temperature conditions while a metal salt of the type MY is reacted with an aqueous medium of hydrogen bromide, where M is the desired metal, Y is a halogen of lower atomic weight than bromine, and n is the valence of M. The metal salt is then treated with a substantially equivalent quantity of the acid in an aqueous solution with sufficient water to form a constant boiling mixture. Fast forward a few years, San Lorenzo et. al. (U.S. Pat. No. 4,401,531) introduced a process for production of electrolytic or high purity zinc from raw materials by hydrometallurgical treatment. San Lorenzo's method disclosed leaching at a pH of 2.5+/− for 0.4 for 15-45 minutes at a temperature below 70 degrees Celsius; the raw material in an aqueous acid solution to dissolve the zinc. San Lorenzo would then filter solid/liquid before extraction using an organic acid. The latter was then stripped in an aqueous acid solution by washing in 2 or 3 stage with another aqueous solution and Zinc was recovered in final process by electrowinning or crystallization.

Following on the steps of San Lorenzo, Duyvesteyn et. al. (U.S. Pat. No. 4,572,771) disclosed a method of zinc recovery from steel plant dusts. Duyvesteyn leached the zinc with an inorganic acid, added a solid/liquid separation step, followed by neutralization with lime. The total zinc recovered from the precipitation slurries was about 20%, from the alkaline zinc solids about 48.1%, and from the galvanizing ashes about 72% (30% metallic zinc).

Later on, U.S. Pat. No. 6,036,937 to Dunaway (also from Applicant) disclosed a method for producing $ZnBr_2$ by essentially (a) dissolving bromine in an aqueous reaction solvent comprising a metal halide salt, and (b) contacting metallic Zinc with the resulting bromine solution to form a zinc bromide Solution essentially free of bromine. Alternative production of zinc bromide has also been disclosed in other patent literature such as U.S. Pat. No. 8,992,882 to Sauer et. al. Again, just focusing on the need for just zinc bromides that meet the purity standards for zinc-bromine batteries, Sauer proposed a succinct method of combining elemental bromine with at least about 1 percent molar excess feedstock zinc metal to about 10 percent molar excess feedstock zinc metal. The zinc metal feedstock would contain metal impurities comprising one or more of greater than 500 ppm Pb, at least 3 ppm Cu, and at least 1 ppm Fe, and producing an isolable zinc bromide composition comprising less than 1 ppm Pb, less than 1 ppm Cu, and less than 1 ppm Fe. Yet once again, this method left another aspect truly relevant for battery electrolytes (i.e., zinc chloride)

untouched. Mostly, because it is the expectation that zinc chloride would be purchased separately from a third-party supplier. Furthermore, Sauer's process appears to be costly, slow, and solely done in batch mode, as well as showing that it will have trouble removing heat.

Variations of the above general process, including the preparation of other halides, e.g., chlorides, and the use of other metals, e.g., zinc, can be found in, e.g., U.S. Pat. Nos. 6,117,408, 7,087,209; 9,685,543.

A critical issue with zinc bromine batteries is the need for a high purity zinc bromide solution in order for the battery to work properly. The use of low-cost $ZnBr_2$ sources, in particular the use of zinc sulfate and sodium bromide to generate zinc bromide solutions, can be problematic due to the presence of substantial amounts of iron (Fe) impurities. During each charge and discharge cycle, a battery suffers changes in its energy density and impurities within the electrolyte begin to show their strong non-conductive presence and therefore significantly hamper the performance of the battery. This implies that those having ordinary skills in the art would need to get rid of these impurities (i.e., Fe) if it is expected to be able to run a $ZnBr_2$ battery for a long amount of time. Previous literature shows how to achieve certain purification of Zinc brines by using different concentrations of hydrogen peroxide (See Patil, Anil, and Pallavi Managave. "*The Effect of Peroxide Concentration when Removing Iron from Brine: A Kinetic Study*." Paper presented at the SPE Bergen One Day Seminar, Bergen, Norway, April 2014) for the preparation of your $ZnBr_2$ solution, instead of distilled water, when dissolving the zinc sulfate and sodium bromide salts. This causes all the Fe to be oxidized to $Fe^{+3}$ and to precipitate out of solution. Nonetheless, even with this additional step the separation between the electrodes is quite large and the electrode area is low, so there are very substantial ohmic losses in this type of configuration. This means it is not useful for charge/discharge cycle data. In fact, typical levels of trace metals observed in commercial battery electrolytes made from off-the-shelf zinc bromide and zinc chloride blends show them to contain at least 14 ppm of lead (Pb) and sodium (Na), at least 5 ppm of lithium (Li), at least 2 ppm of calcium (Ca) and boron (B); among other impurities not beneficial for proper battery performance. Their pH level is typically in the range of 3.5-4.5, their density between 1.58 to 1.62, and their color is orange/yellow, mainly due to the remaining presence of bromine.

2. The Search for a Production Method of Ultra-Pure Zinc Compounds

Regardless of the methods used throughout history, the ultimate goal of the processes for producing electrolytic zinc compounds has always been targeted towards obtaining the highest degree of purity in zinc.

For instance, the "Roast, Leach, and Electrowin" (RLE) process, would "roast" zinc sulphide concentrates, to produce impure zinc oxide (calcine) and $SO_2$ gas which would then be converted into sulphuric acid. The calcine would then be "leached" with a sulphuric acid solution recycled from the "electrowinning" stage. The separation of the leaching pulp produces an impure solution which would then be purified by cementation with zinc powder. The purified solution is sent to zinc electrowinning to produce the zinc plates, which are then sent to the melting and casting stage. However, impurity concentration levels low enough to achieve extreme quality electrowinning were never achieved therefore, not achieving an ultra-pure zinc; unless further processing was performed which in turn would require most time and monetary investments.

Other generic processes use the acid from the leaching step to dissolve zinc and then selectively extracting the dissolved zinc by means of an organic acid solvent which acts as an extractant. Thereafter, the zinc-laden organic acid is treated to recover this zin in the form of an aqueous solution and regenerate the organic solvent to be subsequently recycled.

In typical electrolyte productions, $ZnBr_2$, bromine complex additives (BCA), and support electrolytes (KBr, $ZnCl_2$) are bought separately from manufacturers containing different specifications and impurities. Thus, making it difficult to obtain consistent results in battery production. This problem is then solved by making the batteries large enough but still having to face other disadvantages, such as:

- The need every 1-4 cycles to short the terminals across a low-impedance shunt while running the electrolyte pump, to fully remove zinc from battery plates.
- Low areal power (<0.2 W/cm2) during both charge and discharge, which translates into an excessive cost of power.
- Low Round Trip DC-DC efficiency of up to 80%, which is significantly lower than Li-ion batteries, which are typically 90% or more.
- Low energy-density (approximately 42 Wh/kg).
- Complex construction with moving parts.

Most typically, suppliers of zinc chloride provide a purity of up to 99% as they obtain such a product by mixing zinc and hydrogen chloride. Because zinc exists in only one oxidation state 2+, this simplifies purification of the chloride but still requires battery manufacturers to purify their purchased products by either recrystallization from hot dioxane, or sublimation in a stream of hydrogen chloride, followed by heating sublimate to 400 degrees Celsius in a stream of dry nitrogen gas. $ZnCl_2$ has long been employed as an electrolyte for electrochemical devices, albeit until recently only dilute $ZnCl_2$ electrolytes had been employed, e.g., mixed with $NH_4Cl$ for optimal conductivity properties.

Dilute $ZnCl_2$ electrolytes can exhibit interesting results compared to other dilute Zn electrolytes. In C. Wang, Z. Pei, Q. Meng, et al. *Toward flexible zinc-ion hybrid capacitors with superhigh energy density and ultralong cycling life: the pivotal role of $ZnCl_2$ salt-based electrolytes Angew*. Chem., 133 (2021), pp. 1003-1010; it has been reported that 2 m $ZnCl_2$ is the optimal electrolyte for the aqueous $Zn^{2+}$ based electrical double layer capacitors (EDLCs). In particular, the density functional theory (DFT) studies here suggest that the desolvation energy is much lower for [ZnCl]+ than $Zn^{2+}$ from the electrolytes, which is unique for $ZnCl_2$. The notion of [ZnCl]+ as the cation charge carrier is interesting, which begs the answer for the question: whether $Zn^{2+}$ or [ZnCl]+ is the de facto charge carrier for the operation of cathode materials in aqueous batteries that employ $ZnCl_2$, including its water-in-salt electrolytes as the electrolyte. Further investigations into this question are warranted.

When the concentration of $ZnCl_2$ is further increased, the viscosity of the electrolytes increases, which lowers the ionic conductivity. However, the benefits of higher concentrations (i.e., less "diluted" $ZnCl_2$) may potentially outweigh the disadvantages of the decreased conductivity by conjuring intriguing properties. This, added to the issue of purity in $ZnCl_2$ does not provide certainty to battery manufacturers due to the varying electrochemical performance.

3. Cost Effective Battery Systems

Since 1926, it has been known in the art that bromine and zinc do not react with each other directly and require the formation of the intermediates ZnO and HBr.

As it can be observed from the above discussion, zinc bromine flow, and to a certain extent, non-flow batteries are considered to represent a promising next-generation battery technology due to their low-cost, high-energy densities, and abundance of the constituent materials. See Li, X. J., Li, T. Y., Xu, P. C., Xie, C. X., Zhang, Y. H., Li, X. F., *A Complexing Agent to Enable a Wide-Temperature Range Bromine-Based Flow Battery for Stationary Energy Storage*. Adv. Funct. Mater. 2021, 31, 2100133. However, zinc bromine batteries suffer from severe gas generation, which deteriorates the electrochemical cycling performance and limits their design given the expensive electrolyte-flowing system required. Accumulation of these gases in the cell is prevented by an electrolyte flowing system which makes the importance of minimizing the gas generation reaction seldomly addressed. However, in order to endow flexibility in the cell design for and achieve wide acceptance of the cost-effective $ZnBr_2$ chemistry in consumer applications such as the pouch format, new strategies for preventing gas generation must be developed. Enter the world of deep eutectic solvent (DES) mixtures.

A DES is an eutectic mixture of Lewis or Brønsted acids and bases that is widely used in various fields (e.g., separation, synthesis, and electro-mechanical processes) due to its simplicity in preparation, low cost, low-toxicity, and tunable chemical property. A DES can be also used as an electrolyte for batteries as exemplified by the DES-based lithium battery and zinc-organic battery. See J. Song, Y. Si, W. Guo, D. Wang, Y. Fu, Angew. *Organosulfide-Based Deep Eutectic Electrolyte for Lithium Batteries*. Chem. Int. Ed. 2021, 60, 9881. The ionic liquid-like ion conducting property of a DES renders it a possible electrolyte material option; however, DES-based battery technology is still in its infancy. With regard to the possible use of DESs in battery applications, special attention is being provided to halide-based DESs for zinc bromide-based batteries, considering their potential to provide Br-conduction, the high solubility of $Br_2$, and the $Br_2$ capturing ability.

In Heo, J., Shin, K., Kim, H.-T., *A Zinc-Bromine Battery with Deep Eutectic Electrolytes. Adv. Sci.* 2022, 9, 2204908., a DES electrolyte was designed by simply mixing $ZnBr_2$, $ZnCl_2$, and MEPBr. Each DES was prepared by simply mixing the required amounts of $ZnBr_2$, $ZnCl_2$, and MEPBr at 115° C. without any further treatment. In order to dissolve the parent salts completely, the DESs were kept in an oven for more than three days before use. Final products were in the form of transparent brown liquids. By virtue of the water-free feature and superior $Br_2$ adsorption ability of the electrolyte, the zinc bromide batteries using this DES could be operated in a closed coin-type configuration without any gas generation. Experimental and computational analyses elucidated the reconstruction of MEPBr and the formation of a Zn-halide complex anion. The inclusion of Cl— not only affected the ion mobility but also improved the cycling stability and reaction kinetics, resulting in better cycling performance of the DES zinc bromide battery with Cl—. By exploiting the gas-evolution-free feature of the BCM DES, a flexible pouch-type DES zinc bromide battery was successfully demonstrated. However, in this process the extraction with solvents does not contain a purification stage and consequently the organic solvent is not capable of producing a zinc bromide to zinc chloride of high purity, without the additional MEPBr. In addition, the raw material fed is very specific which renders mass producing this process ultimately impossible.

Enter the world of carbon zinc batteries, particularly zinc chloride. Introduced around the 1900s, a carbon zinc battery with a slightly acidic electrolyte consisting mainly of zinc chloride in water was found to provide an economical power source for devices requiring light to moderate drain because of the use of inexpensive materials and their time proven constructions. At that time, they were mostly used for flashlights due to their short capacity. As technology evolved, the service capacity of a zinc chloride batteries increased due to the use of purer grades of manganese dioxide, the addition of graphite powder to the manganese dioxide to lower internal resistance, better sealing, and purer zinc for the negative electrode. Their service capacity was not a fixed number of ampere hours because the battery functions at different efficiencies depending upon the conditions imposed upon it. The service varies with current drain, operating schedule, and cutoff voltage. However, these batteries are also affected by the operating temperature and storage conditions.

Nowadays, side reactions between impurities in the zinc chloride anode, and the ammonium chloride electrolyte have been shown to increase the self-discharge rate and promote corrosion of the cell. Formerly, the zinc was coated with mercury (Hg) to form an amalgam in order to protect it. Given that this is an environmental hazard, current production batteries no longer use mercury and manufacturers must now use more highly purified zinc to prevent local action and self-discharge. Yet, the quest to obtain such a pure zinc chloride product has not been deemed successful and therefore the combination of zinc bromide to zinc chloride use in battery electrolytes have not been sufficient to extract all of the benefits that come with zinc chloride batteries (e.g., continuous-use in high-drain applications).

4. The Use of Zinc Bromide as a Catalyst

Zinc bromide has proved to be a facile and efficient catalyst by stereoselective semipinacol rearrangement of α-hydroxy epoxides. See *Zinc bromide as catalyst for the stereoselective construction of quaternary carbon: improved synthesis of diastereomerically enriched spirocyclic diols*; Yong Qiang Tu et. al.; Journal of the Chemical Society, Perkin Transactions 1 Issue 22, 2000. This heterogeneous catalyst significant attraction has come about mainly due to economic and environmental considerations (low toxicity), as it is generally inexpensive and readily available. Furthermore, it can be handled conveniently and easily removed from the reaction mixture, thus making experimental procedures simple. In recent times, the application of $ZnBr_2$ as catalyst for the synthesis of organic compounds and heterocyclic molecules has been reported in the literature. Nonetheless to date, the oil and gas industry has mostly used zinc bromide to displace mud in oil wells, while the electrical and metallurgical industries have used it in electrolysis and catalysis.

5. Conclusion

As it can be observed, none of the references teach or suggest a method for manufacturing zinc bromide and zinc chloride blends on a large (continuous) and small (batch) scale, commercial basis with controlled purities for adequate battery production. It would therefore be desirable to produce zinc bromide and zinc chloride blend from inexpensive raw materials directly in the reactor. Consequently, these would fulfill the need for an inexpensive, and simple method for rapidly manufacturing zinc bromide and zinc chloride blends in large quantities, with controlled purity levels for consistent electrochemical performance.

SUMMARY

The present invention attempts to solve one or more of the abovementioned needs, by providing a cost-effective method for producing an ultra-pure zinc bromide and zinc chloride blend, utilizing a zinc bromide to aqueous solution as a catalyst which, without it, would be inefficient to produce. This represents a critical step forward in accelerating the market adoption of zinc batteries as an energy storage system with higher sustainability, reducing production costs while giving a longer service life and steadier voltage output to electrolyte batterie.

Where others have failed, that is at solely producing an ultra-high purity zinc bromide, the present disclosure achieves more by producing an ultra-pure zinc bromide and zinc chloride blend having reduced metal impurities for the use in battery electrolyte blends, by reacting chlorine with a mixture of zinc bromide and zinc. This method uses a heel of zinc bromide with zinc shot and chlorine. The zinc bromide acts as a catalyst in the reaction wherein the true catalyst will be the bromine, that converts to bromide and then back again to bromine. The ratio of zinc bromide to zinc chloride being in the 5:1 to 15:1 $ZnBr_2$ to $ZnCl_2$. An aqueous solution of zinc bromide will have pure zinc metal added and then this reaction mixture will have chlorine gas bubbled through it. $Cl_2$ will react with the bromide ion (Br—) in solution to make chloride ion (i.e., $ZnCl_2$) and bromine. The bromine in turn will react with the Zn metal to make more $ZnBr_2$. This cycle will continue until all the $Cl_2$ is used up. The direct reaction of a typical $Cl_2$ with zinc in a $ZnCl_2$ solution is very slow which is why in the present invention the $Cl_2$ reacts with the Br-first to make bromine which react fast with Zn in a solution of $ZnBr_2$.

Overall, there will be at the end of the reaction a mixture of zinc bromide and zinc chloride which is controlled by the precise amount of $Cl_2$ charged to the reactor. In fact, such a level of control can be performed, that depending upon the utility needed for the battery, the percentages of ultra-pure zinc bromide to zinc chloride can be adjusted to be between 5 and 95 percent. The zinc bromide heel will act as a heat sink for this exothermic reaction. Temperatures are typically kept around 60 to 80 degrees Celcius. Trace metal contents in the parts per million (ppm) for this ultra-pure zinc bromide and zinc chloride blend are less than 1 ppm of trace metals selected from a group consisting of Ag, Al, As, B, Ba, Be, Cd, Co, Cr, Cu, Fe, Li, Mn, Mo, Nb, Ni, P, Pb, Sb, Se, Si, Sn, Sr, Ti, and V; and less than 10 ppm of metals selected from a group consisting of Ca, K, Na, and Mg. The color is close to water white, with an American Public Health Association color standard (APHA) color of less than 11.

This unique battery blend benefits from the usage of the ultra-pure zinc bromide and zinc chloride "water-in-salt" electrolyte blend which minimizes the dissolution of Fe (which is key for batteries); it raises the cation-insertion potential in the cathode, and it depresses the anion-insertion potential in the anode, thus widening the full cell's voltage with a dilute $ZnCl_2$ electrolyte.

BRIEF DESCRIPTION OF THE DRAWINGS

The teachings of the present invention can be readily understood by considering the following detailed description in conjunction with the accompanying drawings.

DETAILED DESCRIPTION

1. Introduction

Reference will now be made in detail to several embodiments of the present disclosures, examples of which are illustrated in the accompanying figures. It is noted that wherever practicable similar or like reference symbols may be used in the figures and may indicate similar or like functionality. The figures depict embodiments of the present disclosure, for purposes of illustration only. One skilled in the art will readily recognize from the following description that alternative embodiments of the structures, systems, and methods illustrated therein may be employed without departing from the principles of the disclosure described herein.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

2. The Figures a. Continuous Stirred-tank Reactor (CSTR)

Figure 1:
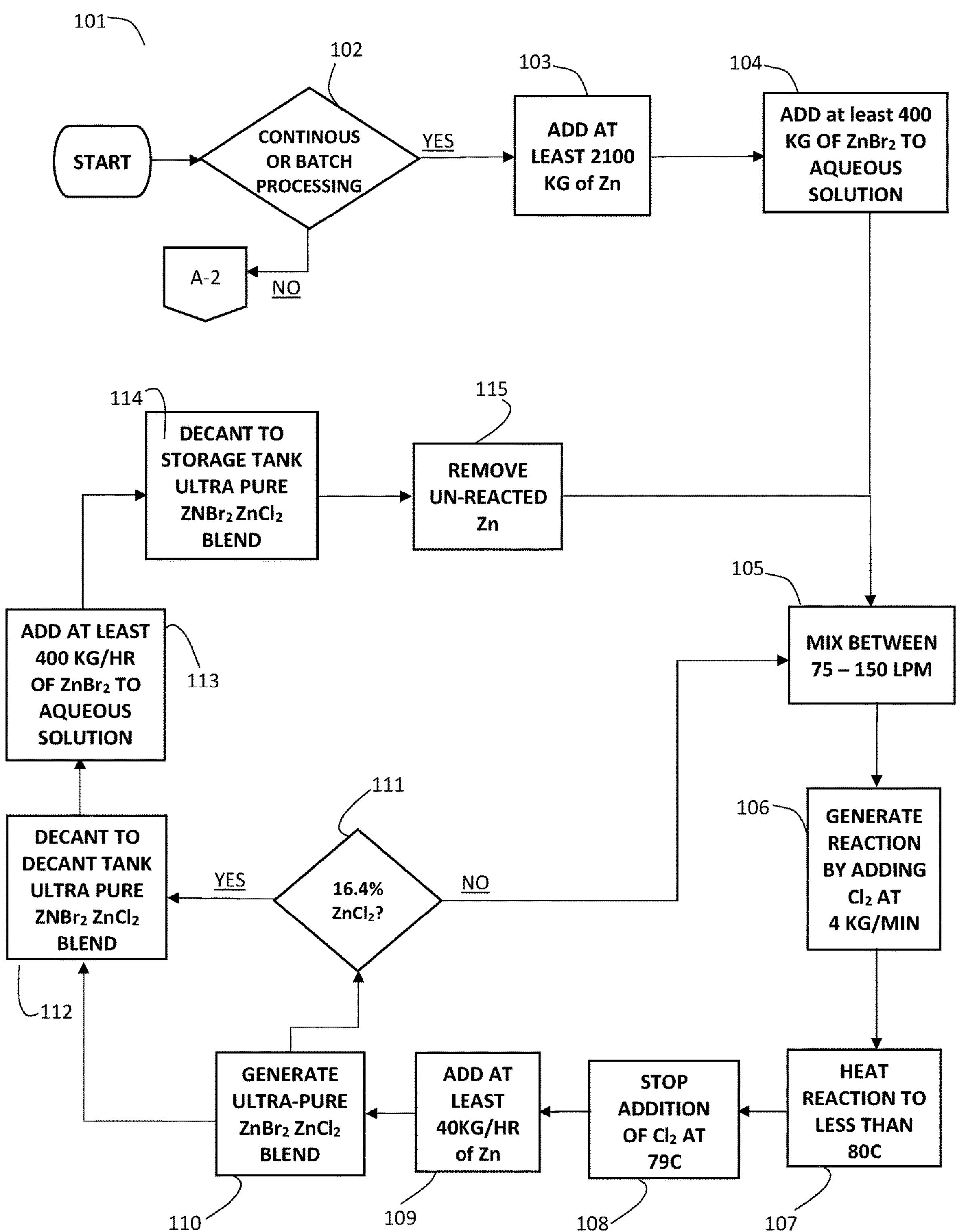
FIG. 1 is a simplified flowchart diagram for the continuous production of an ultra-pure zinc bromide and zinc chloride fluid blend in a reactor system, having reduced metal impurities for the use in battery electrolyte blends, by reacting chlorine with a mixture of zinc bromide and zinc, according to an embodiment of the present disclosure.
Figure 3:
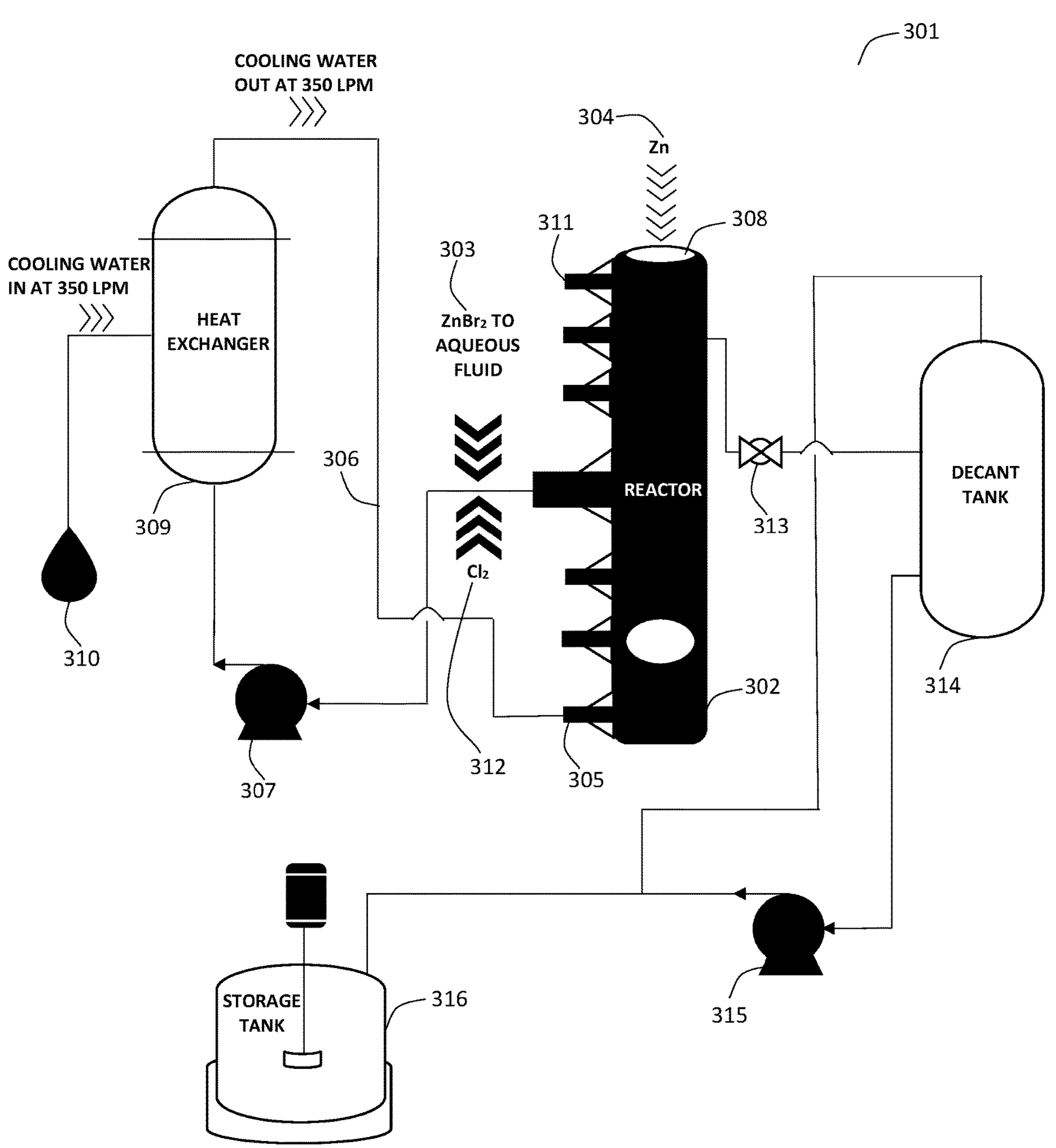
FIG. 3 illustrates a simplified block diagram of quasi-closed loop continuous stirred reactor system for the continuous production of an ultra-pure zinc bromide and zinc chloride fluid blend, according to an embodiment of the present disclosure.

The present disclosure describes a method for the production of an ultra-pure zinc bromide and zinc chloride fluid blend in a reactor system, having reduced metal impurities for the use in battery electrolyte blends, by reacting Chlorine with a mixture of $ZnBr_2$ and zinc. Said method 101 begins in FIG. 1 by determining at 102 whether the requirement is for continuous or batch processing. A continuous stirred-tank reactor (CSTR) as shown in FIG. 3, also known as vat- or backmix reactor, is a common ideal reactor type in chemical engineering. A CSTR often refers to a model used to estimate the key unit operation variables when using a continuous agitated-tank reactor to reach a specified output. The mathematical model (4) works for all fluids: liquids, gases, and slurries. CSTR's are known to be one of the systems which exhibit complex behavior such as steady-state multiplicity, limit cycles and chaos.

$$\frac{dN_i}{dt} = F_{io} - F_i + V v_i r_i \tag{4}$$

where $F_{io}$ is the molar flow rate inlet of species i, $F_i$ the molar flow rate outlet, and $v_i$ stoichiometric coefficient. The reaction rate, r, is generally dependent on the reactant concentration and the rate constant (k). The rate constant can be determined by using a known empirical reaction rate that is adjusted for temperature using the Arrhenius temperature dependence. Generally, as the temperature increases so does the rate at which the reaction occurs. Residence time, τ, is the average amount of time a discrete quantity of reagent spends inside the tank and is calculated by dividing the volume of the vessel by the volumetric flow rate of the fluid through the system. τ, is typically expressed in τ=V/F, where V is the volume of the reactor 302 and F the volumetric flow rate of fluid.

This initial step is critical for the embodiment of the invention as it is used to determine an array of specifications regarding reactor system 301. Thereafter, at 103, adding into a reactor 302 using a solid feeder 308 connected to the reactor 302, at least 2100 kilograms of zinc and at 104 adding using an inlet feed 305 connected to a piping system 306 and then connected to the reactor 302, at least 400 kilograms into the reactor of a zinc bromide to aqueous solution. The zinc added at 103 typically comprises of at least 99.99 wt. % Zinc; less than 0.0001 wt. % of Al and Cd; at least 0.0002 wt. % of Fe; and at least 0.0017 wt. % of Pb. The zinc bromide to aqueous fluid typically consists of: less than 1 parts per million (ppm) of Pb, Cd, As, Cr, Co, Fe, Ni, Nb, Cu, Rh, Pd, Ag, Mg B, and Al; less than 3 ppm of Hg, V, Mo, and Ru; less than 6 ppm of Li; and less than 8 ppm of Ca. Furthermore, the zinc bromide to aqueous fluid typically has pH levels 5.5 to 5.6 and an APHA color value of less than 11.

The piping system 306 and a centrifugal recirculating pump 307 are used at 105 for mixing, the added zinc at 103 with the added zinc bromide to aqueous solution at 104 in reactor 102 at rate between 75 and 150 liters per minute. Such a mixing step circulates through a heat exchanger 309, which obtained water from a reservoir or a city connection 310. Said heat exchanger 309 is used to regulate the temperature of the reactor to from 20 degrees Celsius to 80 degrees Celsius. The cooling of water at the heat exchanger 309 needs to occur at a rate of at least 350 liters per minute for the solution (and future reaction) within reactor 302 to be able to occur. As such, the cooling capacity of the heat exchanger 309 is around 70 KW. By means of centrifugal recirculating pump 307, the mixing 105 of the added zinc bromide to aqueous fluid solution with the added zinc occurs at a flow rate between 75 to 150 liters per minute (LPM).

Upon mixing at 105 the added zinc with the added zinc bromide to aqueous solution and when the temperature in the reactor is at least 20 degrees Celsius, step 106 of generating, using the piping system, a reaction by adding into the reactor at least 4 kilograms per minute of chlorine when the temperature in the reactor is at least 20 degrees Celsius is performed. Chlorine (which can be in either liquid or gaseous form) is added at 106 into the reactor 302 through the inlet feed 305 at rate of at least 4 kilograms per minute (kg/min) which; upon constant mixing through the centrifugal recirculating pump 307, it will generate reaction as expressed by the following equations (5) and (6):

$$ZnBr_2 + Cl_2 \rightarrow ZnCl_2 + Br_2 \tag{5}$$

$$Zn + Br_2 \rightarrow ZnBr_2 \tag{6}$$

Once the generated reaction 106 has been proven to be stable, embodiments of the present disclosure allow for the addition of chlorine 106 to ramp up to 45 kilograms per hour. Reaction 106 will then heat up at 107 to less than 80 degrees Celsius by continuously adding chlorine at a rate of at least 4 kilograms per minute and mixing the zinc bromide to aqueous fluid solution with the added zinc. Although heat exchanger 309 will maintain the temperature between said range, chlorine feed 312 will be stopped at 108, once the temperature indicators 311 of reactor 102 reach 79 degrees Celsius. Although the chlorine feed 106 will be stopped at 108, adding zinc at 109 into the reactor using the solid feeder connected to the reactor a solution at a rate of at least 40 kilograms per hour will be performed, to help reduce and maintain the temperature in reactor 302 at less than 80 degrees C. At which point, a solution indicator sensor in reactor 302 will determine if a minimum of wt. % of 16.4 zinc chloride has been obtained. Reaching such a level will indicate that the method of the present invention has already generated at 110 the ultra-pure zinc bromide and zinc chloride fluid blend in the reactor. Thereafter, if the solution indicator determines that no such a minimum wt. % of zinc chloride is achieved, the disclosed embodiments of the present invention at 111 will repeat the steps of (i) adding into a reactor using a solid feeder connected to the reactor, at least 2100 kilograms of zinc; (ii) adding using an inlet feed connected to a piping system and then connected to the reactor, at least 400 kilograms into the reactor of a zinc bromide to aqueous solution; (iii) mixing, using a centrifugal recirculating pump connected the piping system at a flow rate between 75 and 150 liters per minute, the added zinc bromide to aqueous solution with the added zinc in the reactor; (iv) generating, using the piping system, a reaction by adding into the reactor at least 4 kilograms per minute of chlorine when the temperature in the reactor is at least 20 degrees Celsius; (v) heating the reaction to less than 80 degrees Celsius by continuously adding chlorine at a rate of at least 4 kilograms per minute and mixing the added zinc bromide to aqueous solution with the added zinc; (vi) stopping the addition of chlorine into the reactor using the piping system at a rate of at least than 4 pounds per minute, when the temperature in the reactor reaches 79 degrees Celsius; (vii) adding zinc into the reactor using the solid feeder connected to the reactor at a rate of at least 40 kilograms per hour; and (viii) generating in the reactor, an ultra-pure zinc bromide and zinc chloride fluid blend; until the ratio of the generated the ultra-pure zinc bromide and zinc chloride fluid blend in the reactor has reached a minimum of 16.4 weight percent zinc chloride in the decant tank.

Upon solution indicator in reactor 302 determines that a minimum 16.4 wt. % of zinc chloride is achieved, the system 301 will begin decanting 112, using a decant valve 313 connected to the reactor 302, the generated ultra-pure zinc bromide and zinc chloride fluid blend to the decant tank 314 at a maximum rate of 550 kilogram per hour.

Thereafter, or in continuous operation with the process cycle above mentioned, and in order to maintain the achieved minimum 16.4 wt. % of zinc chloride, the system 301 will begin adding at 113 zinc bromide to aqueous solution into the reactor using the piping system 306 connected to the reactor 302, at a rate of at least 400 kilograms per hour. Similarly, in continuous operation the system will begin at 114 decanting, using the water white fluid pump 315 connected to the decant tank 302, the generated ultra-pure zinc bromide and zinc chloride fluid blend from the decant tank 314 to storage tank 316 at a flow rate between 75 to 150 liters per minute. The storage tank will consist of a construction material typically in the form of an epoxy vinyl ester resin having a lower styrene-content resin that has an optimized epoxy backbone and resulting superior thermal properties and corrosion resistance performance. These resins typically offer superior stability compared to conventional vinyl ester resins and therefore provide additional flexibility to fabricators in storage and handling. The storage tank is then used to fulfilling demand of the generated ultra-pure zinc bromide and zinc chloride fluid blend of the present invention and levels of it will be monitored using submersible level transmitter or sensors with auto-calibration algorithms that provide accurate level readings of the stored ultra-pure zinc bromide and zinc chloride fluid blend. This level monitoring system uses wireless ultrasonic sensors that calculate the level of the ultra-pure zinc bromide and zinc chloride fluid blend by measuring the distance between the sensor and fluid's surface.

According to an embodiment of the present disclosure, generating the ultra-pure zinc bromide and zinc chloride fluid blend at 110 being done in a continuous stirred-tank reactor (CSTR) system 301, traces of un-reacted zinc metal will remain at the bottom of reactor 302. Therefore, to continuously operate the system 301 while maintaining the quality of the generated ultra-pure zinc bromide and zinc chloride fluid blend, it is necessary to remove at 115 from the reactor 302 traces of unreacted zinc through a filter. The filter characteristics comprise a micron rating of 5 μm; an initial efficiency of at least 97%; and a media type Polypropylene microfiber material. The Polypropylene Microfiber contains about 3.5-5.5 sq. mt. of usable filter and also helps absorb any unwanted trace oils that could leak from the multiple apparatuses used in the present disclosure; thereby ensuring the ultra-pure zinc bromide and zinc chloride fluid blend characteristics of:

- between 5 and 95 percent by weight zinc bromide;
- between 5 and 95 percent by weight zinc chloride;
- between 2.55 and 48.5 percent by weight of chloride;
- between 3.55 and 67.45 percent by weight of bromide;
- between 22.4 and 35.6 percent by weight of zinc;
- less than 1 ppm of trace metals selected from a group consisting of Ag, Al, As, B, Ba, Be, Cd, Co, Cr, Cu, Fe, Li, Mn, Mo, Nb, Ni, P, Pb, Sb, Se, Si, Sn, Sr, Ti, and V;
- less than 10 ppm of metals selected from a group consisting of Ca, K, Na, and Mg;
- a density between 16 and 21 ppg measured at 20 degrees Celsius;
- between −1.7 to 2.0 pH levels;
- an APHA color of less than 11; and
- less than 40 ppm of free bromine.

Lastly, in order to maintain the ratio of the generated the ultra-pure zinc bromide and zinc chloride fluid blend in the reactor at a minimum of 16.4 percent zinc chloride in the decant tank, the continuous stirred-tank reactor (CSTR) process then repeats the steps of (i) adding into a reactor using a solid feeder connected to the reactor, at least 2100 kilograms of zinc; (ii) adding using an inlet feed connected to a piping system and then connected to the reactor, at least 400 kilograms into the reactor of a zinc bromide to aqueous solution; (iii) mixing, using a centrifugal recirculating pump connected the piping system at a rate between 75 and 150 liters per minute, the added zinc bromide to aqueous solution with the added zinc in the reactor; (iv) generating, using the piping system, a reaction by adding into the reactor at least 4 kilograms per minute of chlorine when the temperature in the reactor is at least 20 degrees Celsius; (v) heating the reaction to less than 80 degrees Celsius by continuously adding chlorine at a rate of at least 4 kilograms per minute and mixing the added zinc bromide to aqueous solution with the added zinc; (vi) stopping the addition of chlorine into the reactor using the piping system at a rate of at least than 4 pounds per minute, when the temperature in the reactor reaches 79 degrees Celsius; (vii) adding zinc into the reactor using the solid feeder connected to the reactor at a rate of at least 40 kilograms per hour; (viii) generating in the reactor, an ultra-pure zinc bromide and zinc chloride fluid blend; (x) decanting, using a decant valve connected to the reactor, the generated ultra-pure zinc bromide and zinc chloride fluid blend to a decant tank at a maximum rate of 550 kilogram per hour; (xi) adding the zinc bromide to aqueous solution into the reactor using the piping system connected to the reactor, at a rate of at least 400 kilograms per hour; (xii) decanting, using a water white fluid pump connected to the decant tank, the generated ultra-pure zinc bromide and zinc chloride fluid blend from the decant tank to a storage tank at a flow rate between 75 to 150 liters per minute; and (xiii) removing from the reactor traces of unreacted zinc through a filter.

b. Batch

Figure 2:
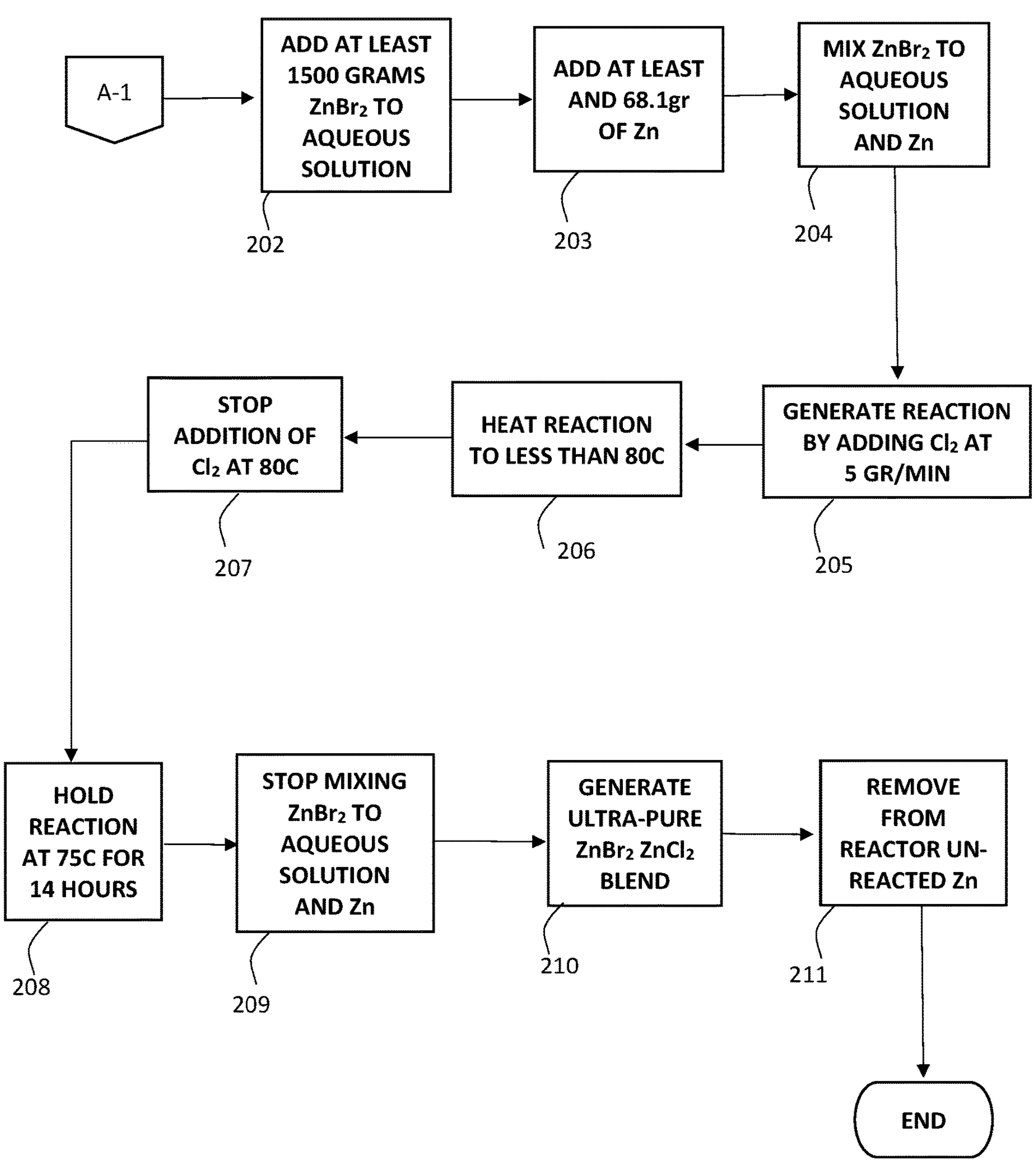
FIG. 2 illustrates a simplified flowchart diagram for the batch production of an ultra-pure zinc bromide and zinc chloride fluid blend in a reactor system, having reduced metal impurities for the use in battery electrolyte blends, by reacting chlorine with a mixture of zinc bromide and zinc, according to an embodiment of the present disclosure.
Figure 4:
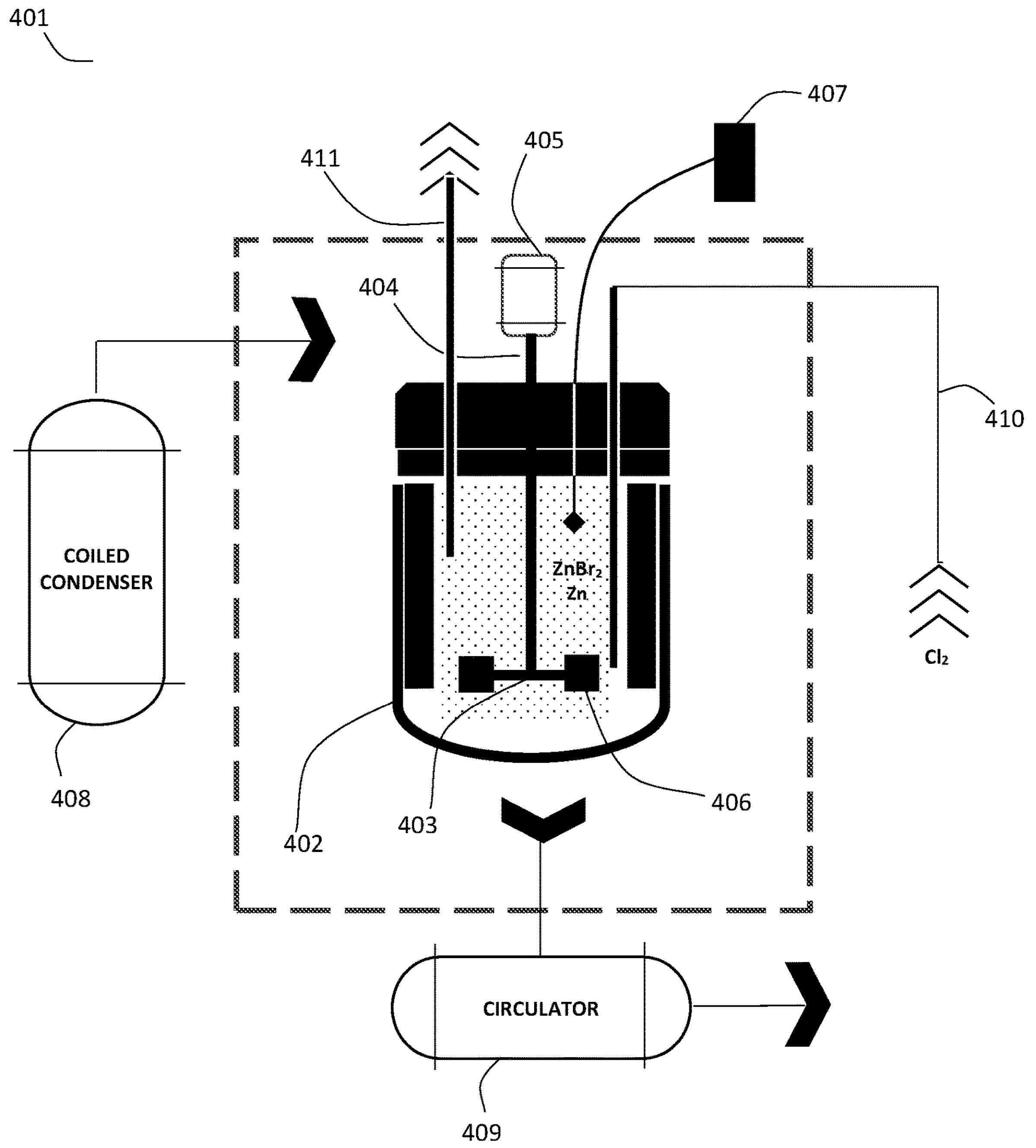
FIG. 4 illustrates a simplified block diagram of quasi-closed loop batch stirred reactor system for the batch production of an ultra-pure zinc bromide and zinc chloride fluid blend, according to an embodiment of the present disclosure.

Turning over to FIG. 2, it illustrates as 201 a simplified flowchart diagram for the method of generating an ultra-pure zinc bromide and zinc chloride fluid blend in a batch reactor system 401 of FIG. 4, by reacting chlorine with a mixture of zinc bromide and zinc. The generated ultra-pure zinc bromide and zinc chloride fluid blend having reduced metal impurities for the use in battery electrolyte blends.

Chemical producing businesses have long sought better approaches to material processing. One of the main topics of debate is that of batch processing vs. continuous flow. These two types of processing may look different in different industries, for example, manufacturing drugs in the pharmaceutical industry vs. processing liquid waste in the mining industry, but they share more the similarities than differences, no matter the application. In particular, according to disclosures of the present invention; batch processing involves the processing of bulk material in groups through each step of the method disclosed. Under batch processing, processing of subsequent batches must wait until the current is finished. Nonetheless, when demand is small, batch processing or production makes it so that its advantage is the lower initial setup cost and the capability of adjusting the bulk materials to uniquely supply demand. Yet, the issue about catalyzing the reaction still exists and therefore to-date no technical solution has been introduced for generating an ultra-pure zinc bromide and zinc chloride fluid blend. The foregoing has been solved by the particular disclosures of the present invention.

When producing the ultra-pure zinc bromide and zinc chloride fluid blend in batch production mode as illustrated by 102, the process begins by adding at 202 into the reactor 402, at least 1500 grams of zinc bromide to aqueous solution and then at 203 adding, into the reactor, at least 68.1 grams of zinc. The solution would typically comprise 1,500 grams of zinc bromide to aqueous solution but less than 2,500 grams of zinc bromide to aqueous solution. Thereafter, mixing, using a stirrer, the added at least 1500 grams of zinc bromide to aqueous solution and the at least 68.1 grams of zinc occurs at 204. Mixing 204 is usually performed a stirrer agitator arrangement 403 centrally mounted onto driveshaft 404 with an overhead drive unit 405. Impeller blades 406 are mounted on shaft 404. Mixing 204 will occur at a rate of 270 to 350 revolutions per minute. A wide variety of blade designs are used and typically the blades cover about two thirds of the diameter of reactor 407. Thereafter, generating a reaction occurs at 205 using the stirrer agitator arrangement 403, by adding chlorine at a rate of less than 5 grams per minute, when the temperature of the reactor has reached at least 20 degrees Celsius. At least 80.1 grams of chlorine (in either liquid or gaseous form) over a period of 30 minutes (to avoid sudden increases in temperature), is added at 205 through an inlet tube 410 at a rate of 5 grams (gr) per minute (min) when the temperature of the reactor 402 has reached 20 degrees Celsius. Said 205 addition of less than 80.1 grams of chlorine at a rate of less than 5 grams per minute, when the temperature of the reactor has reached 20 degrees Fahrenheit generates a reaction at 205; which when continuously mixing 204 occurs the heating 206 the generated reaction to less than 80 degrees Celsius by continuously adding chlorine at a rate of less than 5 grams per minute. To maintain the temperatures within range and avoid reaching the boiling points of any of the elements in the reactor 402, a combination of a coiled condenser 408 is used to insert colder air, while a circulator 409 extracts and dissipates any hot air around reactor 402. An outlet tube 411 connected to reactor 402 helps dissipate or remove any accumulated gas within.

Once the temperature of thermocouple 407 detects the reaction temperature has reached 79 degrees Celsius, stopping at 207 the addition of chlorine at a rate at a rate of less than 5 grams per minute, when the temperature in the reactor reaches 79 degrees Celsius for a maximum of 14 hours at 208 occurs. Thereafter stopping at 209 the mixing of the zinc bromide to aqueous solution and the zinc with the added chlorine at 18 hours occurs. Ultra-pure zinc bromide and zinc chloride fluid blend in the reactor 402 would have been generated at 210 and removing from the reactor 402 traces of un-reacted zinc metal through glass microfiber filter using a Büchner funnel under vacuum will occur at 211. Said filter comprises a filtration speed of 41 seconds; an airflow rate of 2.6 s/100 ml/in$^2$; a basis weight 121 g/m$^2$; a maximum operating temperature 550° C.; a particle retention in liquid of 2.7 μm; a thickness of 675 μm; a water flow rate of 681 ml/min; and a diameter of at least 7 mm. In batch processing, this provides for the ultra-pure zinc bromide and zinc chloride fluid blend characteristics of:

- between 5 and 95 percent by weight zinc bromide;
- between 5 and 95 percent by weight zinc chloride;
- between 2.55 and 48.5 percent by weight of chloride;
- between 3.55 and 67.45 percent by weight of bromide;
- between 22.4 and 35.6 percent by weight of zinc;
- less than 1 ppm of trace metals selected from a group consisting of Ag, Al, As, B, Ba, Be, Cd, Co, Cr, Cu, Fe, Li, Mn, Mo, Nb, Ni, P, Pb, Sb, Se, Si, Sn, Sr, Ti, and V;
- less than 10 ppm of metals selected from a group consisting of Ca, K, Na, and Mg;
- a density between 16 and 21 ppg measured at 20 degrees Celcius;
- between −1.7 to 2.0 pH levels;
- an APHA color of less than 11; and
- less than 40 ppm of free bromine.

4. Examples of Test Results

To compare the present disclosure, a baseline was established using off-the-shelf commercial-type zinc chloride from companies like Spectrum Mfg. Corp. A 75.5 wt. % zinc bromide to aqueous solution was used and mixed in the same ways described in the present disclosure, particularly FIG. 2 and using the apparatus of FIG. 4. The fluid properties of the resulting zinc bromide to zinc chloride fluid blend were 4.04 wt. % CI; 48 wt. % Br; 23 wt. % Zn; a pH of −0.56; with 0 ppm of $Br_2$. The ICP metal ppm were mostly less than 1, except for Ca, K, Na, and Si which were between 1 and 4 ppm.

Following the same batch processing at least four different examples were carried away taking into consideration that the expected main chemical reactions were (5) and (6).

The range of charges, moles, and weight used are described in the table below. Similarly, the range of the final solution mass, with that of the unreacted zinc and the filtrate weight:

| Charge | Moles | Theory Charge (g) | Actual Weight |
|---|---|---|---|
| Zinc Shot | 1.04-3 | 68.1-196.14 | 68.77-205.87 |
| 75.5 wt. % $ZnBr_2$ | 5.1 | 1531 | 1532.41-1539.2 |
| Water | 16.7 | 300 | 250-287.25 |
| $Cl_2$ | 1.00 | 71.9 | 71 |
| Final Solution Mass | | 1921-1971 | 1924-2101.58 |
| Unreacted Zn | | | 1.83-137.99 |
| Filtrate Weight | | | 1851-1933.43 |

The resulting characteristic of the ultra-pure zinc bromide and zinc chloride fluid blend for four examples using the method of the present disclosure was as shown on the following table:

| Example | Density at 60 F., ppg | Cl, % | Br, % | Zn, % | pH | $Br_2$ ppm |
|---|---|---|---|---|---|---|
| 1 | 17.40 | 3.3825 | 43.3749 | 20.892 | 1.04 | 40 |
| 2 | 16.84 | 4.009 | 41.3336 | 20.565 | 0.76 | 28 |
| 3 | 16.79 | 3.6814 | 41.6979 | 20.421 | 0.98 | 0 |
| 4 | 16.79 | 3.7754 | 41.6594 | 20.549 | 1.03 | 0 |

Lastly, comparative examples were performed showing when no zinc bromide to aqueous solution was present in the reactor. The reaction system was thoroughly cleaned prior to reaction for elimination of bromine/bromide species involved in any previous reactions. For this experiment, the feed material of zinc chloride was prepared by dissolving 1,020 grams of zinc chloride in 1,020 grams of water; therefore, the feed material had a concentration of 50.0% (by weight). In fact, 100 g of chlorine was injected over 42 minutes (2.38 g/min) into the mixture of zinc shot and zinc chloride with stirring at about 350 rpm and at a circulation of 52 degrees Celsius coolant. The temperature rose by 4.3 degrees Celsius at the end of chlorine injection and decreased thereafter. The color of the reaction turned from water white to pale yellow during the course of the chlorine injection and became water white again after 85 minutes of stirring. The reaction mixture was let cooled down to room temperature and stand still overnight before zinc shot were retrieved and weighed, and a liquid sample was submitted for analysis. At the end of the process for this example, theoretical analysis provides that:

Based on weight of zinc reacted there should be:

$$(276.33-254.98)/65.38=0.327 \text{ moles} \quad (7)$$

$ZnCl_2$ formed should be:

$$0.327\ \text{mole} \times 136.29\ \text{g/mole} = 44.50\ \text{g} \quad (8)$$

The actual Cl2 consumed should be:

$$0.327\ \text{mole} \times 70.91\ \text{g/mole} = 23.15\ \text{g} \quad (9)$$

The escaped Cl2 should be:

$$100.0 - 23.15 = 76.85\ \text{g} \quad (10)$$

Therefore, the sum of all components in grams should be:

| ZnCl2 | Zn shots | Cl2 | Total |
|---|---|---|---|
| 2040.00 | 276.33 | 100 | 2416.33 |

Nonetheless, the collected mass after workup in grams totaled 2265.98 grams, divided into 2011 filtrate and 254.98 dried Zn. Therefore, the total losses equaled to 105.35 grams (2265.98−2416.33).

Since 21.35 grams of zinc was consumed, the newly formed zinc chloride should be 44.50 grams which would yield a concentration of zinc chloride after reaction of (44.50+1,020)/(44.50+2,040)=51.07%.

In contrast, the Cl-% value of 26.2 obtained from IC analysis indicated that $ZnCl_2$% should be 50.36% which translates to 14.71 grams of zinc chloride being formed from the reaction of 7.06 g of zinc and 7.65 g of chlorine.

The Zn % value of 24.3 obtained from ICP analysis indicates that ZnCl2% should be 50.65%. Since zinc may be associated with other anions in the solution, some of which may be derived from chlorine, the concentrations of zinc chloride calculated from zinc cation or consumed zinc metals could be higher than actual zinc chloride formed. Therefore, the value from Cl-% should be the most accurate data. As such, the CI-% obtained from IC analysis indicates that total zinc chloride concentration increased by 0.36% after the reaction. This translates to 14.71 g of zinc chloride being formed from the reaction of 7.06 g of zinc and 7.65 g of chlorine. Compared to the total of 276 grams of zinc shot and 100 grams of chlorine that were added to the reactor, the extent of the reaction between zinc and chlorine was very small (7.65/100=7.65%). Side reactions could exist, but the extent could be equally small.

The resulting characteristic of this example were as follows:

| Density at 60 F., ppg | Cl− % | Br− % | Zn % | pH | Free Bromine, ppm |
|---|---|---|---|---|---|
| 13.10 | 26.2 | <0.1 | 24.3 | 2.56 | None Detected |

Mass Balance Calculations

4. Abbreviations and Definitions not Elsewhere Defined

It is noted here that as used in this specification and the appended claims, the singular forms "a," "an," and "the" include plural reference unless the context clearly dictates otherwise. Similarly, as gerunds are derived from their respective verb word form, they include their word reference as well as the verb includes the gerund, unless context clearly dictates otherwise.

All percentages, pans, and ratios are based upon the total weight of the compositions of the present invention, unless otherwise specified. All such weights as they pertain to listed ingredients are based on the active level and therefore do not include solvents or by-products that may be included in commercially available materials, unless otherwise specified. The term "weight percent" may be denoted as "wt. %" herein. All molecular weights as used herein are weight average molecular weights expressed, as grams/mole, unless otherwise specified.

As used herein, an "aqueous solution", "aqueous fluid solution", or "aqueous fluid" is a solution generally made of water and ions, atoms or molecules that have lost or gained electrons, and is electrically conductive. The "Zinc Bromide to aqueous fluid" comprises at least 25 wt. % of water (by weight of the Zinc Bromide), a purity of less than 1 ppm of trace metals selected from a group consisting of Ag, Al, As, B, Ba, Be, Cd, Co, Cr, Cu, Fe, Li, Mn, Mo, Nb, Ni, P, Pb, Sb, Se, Si, Sn, Sr, Ti, and V; and less than 10 ppm of metals selected from a group consisting of Ca, K, Na, and Mg.

While in the foregoing specification this disclosure has been described in relation to certain preferred embodiments thereof, and many details have been set forth for purpose of illustration, the invention is not to be unduly limited to the foregoing which has been set forth for illustrative purposes. On the contrary, a wide variety of modifications and alternative embodiments will be apparent to a person skilled in the art, without departing from the true scope of the invention, as defined in the claims set forth below. Additionally, it should be appreciated that structural features or method steps shown or described in any one embodiment herein can be used in other embodiments as well. When references throughout this specification discuss "one embodiment", "an embodiment", or "embodiments" they shall take the meaning that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment.

As used herein, "and/or" placed between a first entity and a second entity means one of (a) the first entity, (b) the second entity, and (c) the first entity and the second entity. Multiple elements listed with "and/or" should be construed in the same fashion, i.e., "one or more" of the elements so conjoined. Furthermore, the terms "comprising," "consisting," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended.

Unless indicated otherwise, when a range of any type is disclosed or claimed, it is intended to disclose or claim individually each possible number that such a range could reasonably encompass, including any sub-ranges encompassed therein.

We claim:

1. A method for the production of a zinc bromide and zinc chloride fluid blend in a reactor system with a reactor, having reduced metal impurities for the use in battery electrolyte blends, by reacting chlorine with a mixture of zinc bromide and zinc, the method comprising the steps of:

(i) adding, using a solid feeder connected to the reactor, at least 2100 kilograms of zinc to the reactor;

(ii) adding, using an inlet feed connected to a piping system and then connected to the reactor, at least 400 kilograms of a zinc bromide aqueous solution to the reactor;

(iii) mixing, using a centrifugal recirculating pump connected to the piping system, at a flow rate between 75 and 150 liters per minute, the aqueous solution containing the zinc bromide with the zinc in the reactor;

(iv) generating a reaction by adding, using the piping system, at least 4 kilograms per minute of chlorine to the reactor while maintaining the temperature in the reactor at least 20 degrees Celsius;

(v) heating the reaction to less than 80 degrees Celsius by continuously adding chlorine at a rate of at least 4 kilograms per minute and mixing the aqueous solution containing the zinc bromide and zinc;

(vi) stopping the addition of chlorine into the reactor using the piping system at a rate of at least 4 kilograms per minute, when the temperature in the reactor reaches 79 degrees Celsius;

(vii) adding additional zinc into the reactor, after the addition of chlorine has stopped, using the solid feeder connected to the reactor at a rate of at least 40 kilograms per hour;

(viii) generating in the reactor, a zinc bromide and zinc chloride fluid blend;

(ix) repeating steps (iii) through (viii) until a ratio of the generated zinc bromide and zinc chloride fluid blend in the reactor has reached a minimum of 16.4 percent by weight zinc chloride in the decant tank;

(x) decanting, using a decant valve connected to the reactor, the generated zinc bromide and zinc chloride fluid blend to a decant tank at a maximum rate of 550 kilograms per hour;

(xi) adding the zinc bromide aqueous solution into the reactor using the piping system connected to the reactor, at a rate of at least 400 kilograms per hour;

(xii) further decanting, using a water white fluid pump connected to the decant tank, the generated zinc bromide and zinc chloride fluid blend from the decant tank to a storage tank at a flow rate between 75 to 150 liters per minute;

(xiii) removing from the reactor traces of unreacted zinc through a filter; and (xiv) repeating steps (iii) through (viii) and (x) through (xiii) to maintain in the reactor a minimum of 16.4 percent by weight zinc chloride in the zinc bromide and zinc chloride fluid blend in the reactor, and to maintain:

between 5 and 95 percent by weight zinc bromide in the zinc bromide and zinc chloride fluid blend;

between 5 and 95 percent by weight zinc chloride in the zinc bromide and zinc chloride fluid blend;

between 2.55 and 48.5 percent by weight chloride in the zinc bromide and zinc chloride fluid blend;

between 3.55 and 67.45 percent by weight bromide in the zinc bromide and zinc chloride fluid blend;

between 22.4 and 35.6 percent by weight zinc in the zinc bromide and zinc chloride fluid blend;

less than 1 ppm of each of a first group of trace metals consisting of Ag, Al, As, B, Ba, Be, Cd, Co, Cr, Cu, Fe, Li, Mn, Mo, Nb, Ni, P, Pb, Sb, Se, Si, Sn, Sr, Ti, and V;

less than 10 ppm of each of a second group of trace metals consisting of Ca, K, Na, and Mg;

a density between 16 and 21 ppg measured at 70-degree Fahrenheit;

a pH of between 1.7 and 2.0;

an APHA color of less than 11; and less than 40 ppm of free bromine.

2. The method for the production of the zinc bromide and zinc chloride fluid blend of claim 1, wherein the reactor system further comprises:

a heat exchanger connected to the reactor via the piping system and the pump, the reactor having the solid feeder for adding the zinc, the piping system for adding the zinc bromide to aqueous solution and the chlorine, and the pump for mixing the zinc bromide to aqueous solution;

a decant valve connected to the reactor and a decant tank;

a water white fluid pump connected to the decant tank and the storage tank; and and a control system for performing the steps of adding, mixing, generating, heating, stopping, and removing.

3. The method for the production of zinc bromide and zinc chloride fluid blend of claim 1 wherein the chlorine, in the step of generating, using the piping system, a reaction by adding into the reactor at least 4 kilograms per minute of chlorine when the temperature in the reactor is at least 20 degrees Celsius, can be in either liquid or gaseous form.

4. The method for the production of the zinc bromide and zinc chloride blend of claim 1, wherein the filter from the step of removing from the reactor traces of unreacted zinc through a filter further comprises:

a micron rating of 5 μm;

an initial efficiency of at least 97%; and a media type Polypropylene microfiber material.

* * * * *